Oct. 10, 1939.   W. KAFKA ET AL   2,175,841
WELDING MACHINE
Filed May 21, 1938    2 Sheets-Sheet 1
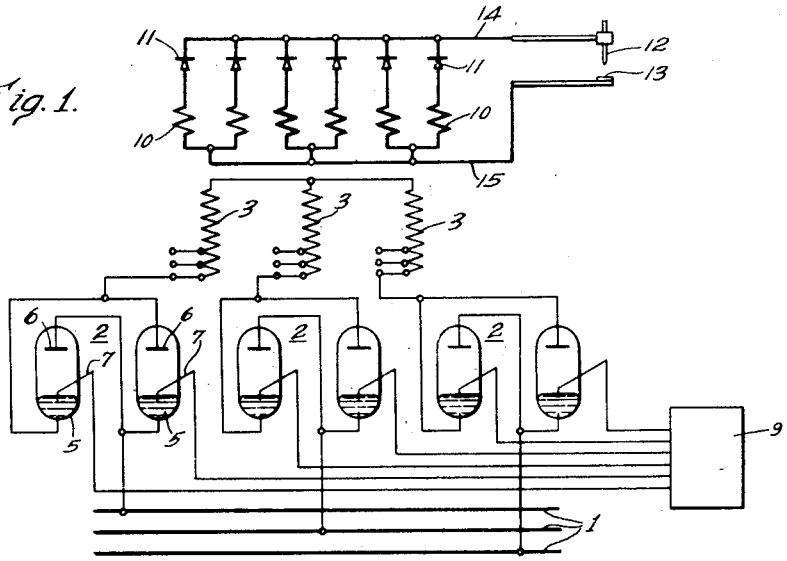
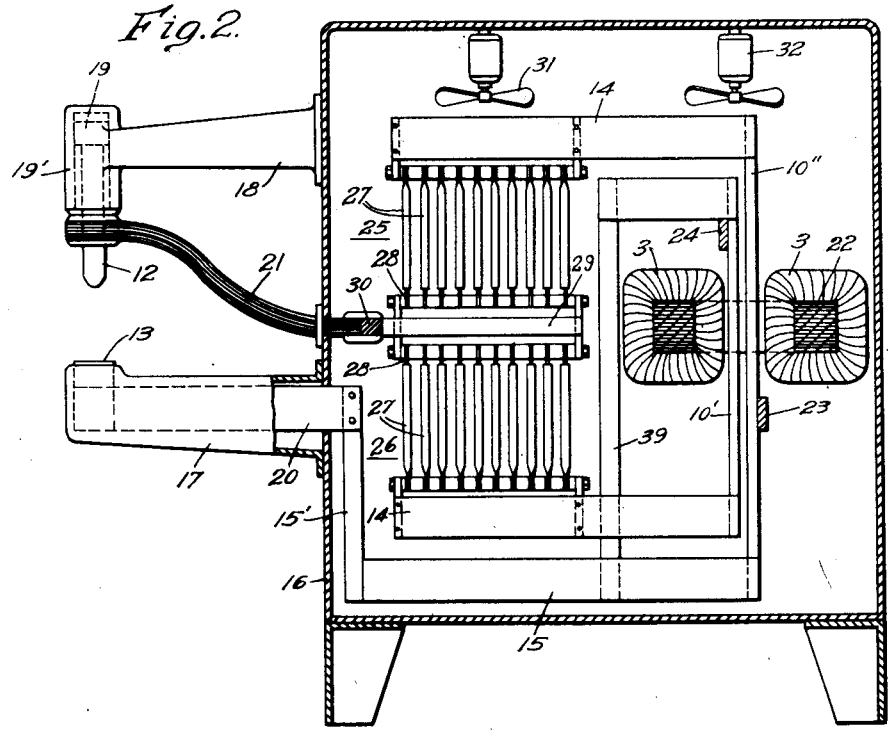
WITNESSES:
C. J. Weller
G. V. Giolma
INVENTORS
Wilhelm Kafka and
Walter Meenen.
BY
ATTORNEY

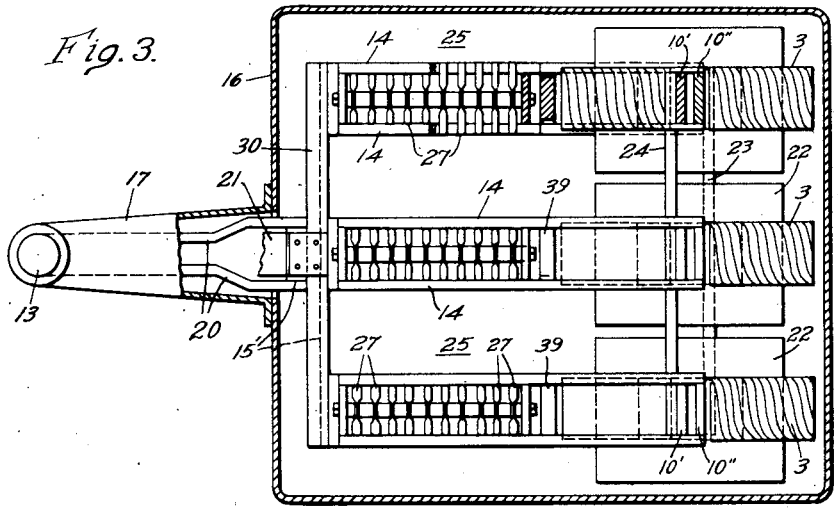
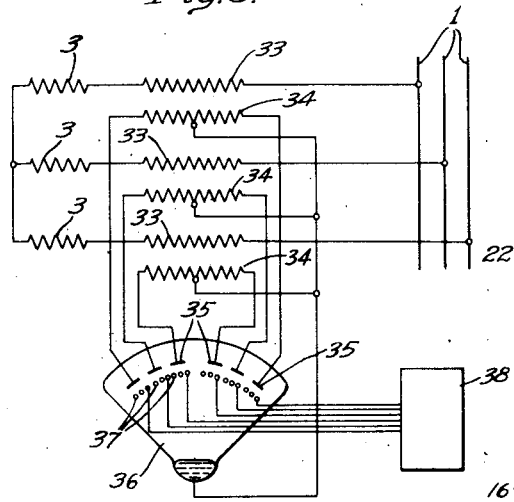
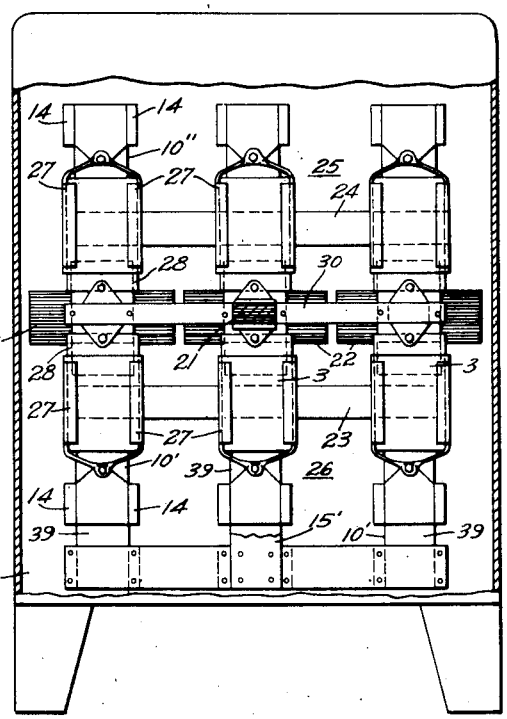

Patented Oct. 10, 1939

2,175,841

UNITED STATES PATENT OFFICE 2,175,841

WELDING MACHINE

Wilhelm Kafka, Berlin-Siemensstadt, and Walter Meenen, Berlin-Friedenau, Germany, assignors to Westinghouse Electric & Manufacturing Company, East Pittsburgh, Pa., a corporation of Pennsylvania Application May 21, 1938, Serial No. 209,160
In Germany May 15, 1937

11 Claims. (Cl. 219—4)

Our invention relates, generally, to electric welding, and it has reference in particular to resistance welding apparatus for performing spot or seam welding operations which require relatively large welding currents.

In welding members of some of the more recently developed alloy metals, ferrous as well as non-ferrous, accurate control of the welding operation is of the utmost importance in preventing the formation of undesirable crystal structure in the region of the weld zone. In order to effectively weld such alloy metals, it has been found desirable to utilize relatively large welding currents, while limiting the duration of the welding operation to a relatively short period of time. In order to secure these relatively large welding currents, the use of alternating current sources of power is distinctly advantageous, as such currents may be readily secured by transformation from the usual high voltage sources of supply available. However, where alternating currents are used in the welding circuit, it has been found that the inductance of the welding circuit, and particularly in the case of welding machines of large capacity where the supporting arms of the welding electrodes are necessarily fairly extensive in order to accommodate the dimensions of the member being welded, produces marked effects which make it difficult to secure satisfactory welds. With the relatively large welding currents necessary in performing such welding operations on large sheets of alloy metals, the inductance of the welding circuit not only results in relatively high reactance drops which effect a lowering of the power factor of, and increase the power losses in, the system, but accurate timing of the welding current is also seriously handicapped by the inertia of the welding current in the welding circuit and the phase displacement of the current and voltage.

It is, therefore, generally an object of our invention to provide for the reduction of the voltage drops in a resistance welding system, and to improve the power factor of the system.

More specifically, it is an object of our invention to reduce the inductive drops in a resistance welding circuit by full wave rectification of the secondary currents of a plurality of transformers adapted for connection to a polyphase source of power.

Another object of our invention is to supply a unidirectional current to a resistance welding circuit by synchronized connection to a polyphase source of power of the primary circuits of a plurality of transformers, the secondary circuits of which are connected to the welding circuit through unidirectional current devices.

A further object of our invention is to facilitate the control of, and reduce the losses incurred in, a resistance welding system, by providing electrode control switch means in the primary circuits of a polyphase connection of welding transformers and rectifying the secondary currents of the transformers so as to supply a unidirectional current to the welding circuit.

Other objects will, in part, be obvious, and will, in part, appear hereinafter.

In practicing a preferred form of our invention a unidirectional welding current may be supplied to a welding circuit, which includes a pair of relatively movable electrode members, by using rectifier devices of the dry plate type connected with the secondary windings of transformers, the primary windings of which are connected to an alternating current source of power, and preferably to a polyphase source of power so as to minimize the effect of the surges of power drawn by the welding circuit on the system supplying the power. Connection of the primary windings to the source may be effected through the use of mercury vapor valve devices, such, for example, as ignitrons, or other suitable electrode controlled valve devices. The mercury vapor valve devices may be controlled in any well known manner, such as through application of timed current impulses to the control electrodes of the devices, from a control source which is synchronized with the source of power, and is effective to vary the effective value of, and the duration of, the current passed by the devices.

For a more complete description of the nature and scope of our invention, reference may be had to the following detailed description, taken in connection with the accompanying drawings in which:

Figure 1 is a diagrammatic view of a welding circuit embodying a preferred form of our invention;

Fig. 2 is a part-section side elevation view of a resistance welding machine embodying the principles of our invention.

Fig. 3 is a part-section plan view of the resistance welding machine of Fig. 2;

Fig. 4 is a part-section front elevation view of the resistance welding machine of Fig. 2, and Fig. 5 represents schematically a welding circuit embodying an alternative form of our invention.

Referring particularly to Fig. 1, it may be seen that the reference numerals 3 denote generally the primary windings of three transformers which are disposed to be connected through their respective pairs of valves 2 to a three-phase source of power 1. These valves 2 may be of any suitable type, such, for example, as the well known ignitron valve and may comprise, generally, a vessel containing a pool of mercury 5 which forms the cathode of the valve, an anode 6 positioned within the vessel in spaced relation to the cathode 5, and an ignition rod or control electrode 7 which is positioned within the vessel with the tip thereof submerged in the pool of mercury. The ignitron valves may preferably be oppositely connected in paired relation with the cathode 5 of one valve and the anode 6 of its associated valve connected to the source 1, and the cathode 5 of the associated valve and anode 6 of the first-mentioned valve connected to the primary winding 3 of a welding transformer, so that complete cycles of current may be passed by the arrangement of valves if desired. The control electrodes 7 of the valves may be connected to a suitable control system 9, by means of which the individual valves may be rendered conductive at the desired instance, so that any desired portion of the half cycles, or any number of full cycles of the alternating current may be utilized in a welding operation.

The control system 9, may, for example, comprise an arrangement, in a manner well known in the art, of vacuum tube devices cooperative with an associated timing circuit which is synchronized with the supply source 1, for applying timed current impulses to the control electrodes 7 in the desired sequence for rendering their respective ignitron valves conductive to pass preselected portions of the alternating current waves.

The secondary windings 10 of the transformers may comprise two sections having a common mid-point, each section having a rectifier device 11 of the dry plate type disposed in series circuit relation therewith for supplying a unidirectional welding current to the electrode members 12 and 13. A common conductor member 14 may be utilized to connect the rectifier devices to the electrode member 12, while the electrode 13 may be connected by means of a conductor member 15 to the common mid-point of each of the secondary windings 10.

Referring to Figs. 2, 3, and 4, it will be seen that in practicing my invention a spot welding machine may comprise, generally, a frame 16 having arms 17 and 18 extending therefrom for supporting the electrode members in any desired manner. The lower electrode 13 may be rigidly secured in the supporting arm 17, while the upper electrode 12 may be supported by the arm 18 in such a manner that it is movable in relation to the electrode 13, being, for example, secured to a piston 19 disposed in the cylinder 19' and operated by the application of fluid pressure thereto.

In order to supply welding current to the electrodes 12 and 13, the three single phase transformers, shown in Fig. 1, may preferably be located in side-by-side relation within the frame 16 in any suitable manner as best shown in Fig. 3. The primary windings 3 thereof may be disposed on the two parallel legs of their respective transformer cores 22, and associated in a suitable manner for connection to a polyphase source of power, as shown in Fig. 1. The secondary windings 10 of the transformers may be constructed in the form of through conductor members 10', 10" which may readily be of such form as to provide ample cross section and cooling surface. These conductor members may be respectively interconnected by means of the horizontal bus bars 23 and 24, so as to effectively tie together the mid-points of the three sets of secondary windings and permit connection thereof to the electrode 13, by means of the buses 15, 15' and 20.

In order to supply a unidirectional welding current to the electrodes 12 and 13, rectifier devices 11 of the dry plate type, each comprising preferably a copper plate 28 that is coated on both sides with a film of cuprous oxide with a metallic coating sprayed thereon, and a contact plate 27 bent into a U-shape about one end of the plate so as to contact with the metallic coating on the cuprous film, may be connected with the through conductors 10 and 10' of each of the secondary windings by means of the bus bars 14.

In order to facilitate connection of the rectifier devices 11 between the conductors 10" and 10' and the electrode 12, the rectifier devices 11 associated with each transformer may be arranged in an upper group 25 and a lower group 26, both groups being disposed in connection with a centrally disposed bus 29 in opposed relation, the copper plates of the rectifier devices of each group being, for example, connected to the bus 29, while the contact plates 27 of the upper and lower groups are connected, respectively by the bus bars 14, to the through conductors 10" and 10' of the secondary windings. The buses 29 may be connected by a tie bus 30, which is disposed to be connected to the electrode 12 by means of a flexible conductor 21 of laminated structure, which will readily accommodate itself to movement of the electrode.

If desired, ventilating means, such as the fans 31, 32 may be provided to facilitate the natural flow of cooling air over the surfaces of the rectifier devices and the conductor members, and so permit an increase in the output obtainable from the machine.

Referring to Fig. 5, it may be seen that in an alternative form of my invention, the primary windings 3 of the welding transformers may be connected to a polyphase source of power 1 through the interposed primary windings 33 of a plurality of double winding reactance devices, the secondary windings 34 of which are connected to the anodes 35 of a single multi-anode mercury vapor valve 36, which is of a form well known in the art. In order to control the flow of current through the primary windings 3, the control grids 37 of the mercury vapor valve are connected to a control source 38 which, in a manner well known to those skilled in the art, may be utilized to apply control impulses of varied occurrence and duration to the control grids 37 in timed relation with the current cycles of the power source 1. The reactance of the primary windings 33 of the reactance devices may thus be varied in a definite sequence and degree to effectively control the current in the primary windings 3 of the welding transformers, and thus control the current in the welding circuit.

Since certain changes may be made in the above construction, and different embodiments in the invention may be made without departing from the spirit thereof, it is intended that all the matter contained in the above description, or shown in the accompanying drawings, shall be considered as illustrative and not in a limiting sense.

We claim as our invention:
1. A resistance welding system comprising, an alternating current source of power, a welding circuit including a pair of relatively movable electrode members adapted to engage a workpiece, transformer means, switch means for connecting the transformer means to the source of power, rectifier means having a relatively high surge current capacity connected between the transformer and the welding circuit for reducing the reactive losses in the welding circuit, and means for controlling the switch means to effect energization and deenergization of the welding circuit.

2. The combination, in a resistance welding system, of a source of alternating current power, a welding circuit including relatively movable electrodes adapted to be pressed into engagement with a workpiece, a transformer provided with a primary winding and a secondary winding having a center tap connection to one of the electrodes, switch means for connecting the primary winding to the source, control means for effecting operation of the switch means, and a plurality of rectifier means connected in opposed relation to a common bus across the secondary winding for supplying a unidirectional current to the other electrode.

3. A resistance welding system comprising, a source of power, transformer means connected with the power source, reactance means for controlling the current supplied to the transformer means, control circuit means connected with the reactance means for controlling the impedance thereof, a welding circuit including a pair of relatively movable electrode members, rectifier means interposed between the transformer means and the welding circuit for supplying a unidirectional current thereto to reduce the reactive drops in the welding circuit, and mercury vapor switch means associated with the control circuit means for applying voltage impulses thereto to effect variations in impedance of the reactance means.

4. In a resistance welding system, the combination of a polyphase source of power, a welding circuit including a pair of relatively movable electrodes supported for engaging a workpiece, a plurality of transformers each having a primary winding for connection to the source of power and a pair of through bar conductor members disposed in series connection for a secondary winding, circuit means for connecting a mid-point of the secondary winding to one electrode, rectifier means for effecting unidirectional flow of current in the conductor members, and conductor means connected in common with the rectifier means for connecting said secondary windings to the other electrode to reduce the reactance losses by supplying a flow of unidirectional current to the welding circuit, and vapor discharge control means for connecting the primary winding to the source.

5. A resistance welding machine comprising, a pair of relatively movable electrode members, a transformer having a primary winding disposed to be connected to a source of alternating current, a secondary winding associated with the primary winding including a pair of through bar conductor members, circuit means associated with the conductor members for connecting a mid-point thereof to one of the electrode members, a plurality of unidirectional current devices connected in opposed relation to a centrally disposed bus in series circuit relation with the through bar conductor members, conductor means for connecting said bus with the other electrode member, and switch means for connecting the primary winding to the source.

6. A welding machine comprising a pair of relatively movable electrode members, a source of polyphase power, transformer means including a plurality of primary windings, switch means for connecting the primary windings to the source, a secondary winding associated with each of the primary windings and connected at a mid-point with one of the electrodes, oppositely disposed dry plate rectifier means connected at one end to a centrally disposed bus for connection to the other electrode and at the other ends to the respective ends of the secondary winding for providing for a flow of unidirectional current between the electrodes.

7. A resistance welding machine comprising a pair of relatively movable electrode members, a polyphase source of power, a plurality of transformers having primary windings, igniter controlled switch means for connecting the primary windings to the source, a through conductor secondary winding associated with each of the primary windings, circuit means for connecting the mid-point of the secondary winding with one of the electrodes, and a pair of dry plate type rectifiers connected across the secondary winding in opposed relation to a common bus for connection to the other electrode.

8. A resistance welding machine comprising, a pair of relatively movable electrode members, a plurality of single phase transformers arranged in side-by-side relation having primary windings arranged for energization from a polyphase source, ignition switch means for controlling connection of the primary windings to the source, a plurality of bar conductor secondary windings associated with the primary windings, conductor means for connecting the mid-points of the secondary bar conductor windings in common to one of the electrodes, and a pair of dry plate type rectifier devices connected in opposed circuit relation across each secondary winding to a centrally disposed conductor member, said conductor members being connected in common to the other electrode.

9. A resistance welding system comprising a polyphase source of power, a welding circuit including a pair of electrode members, a plurality of primary transformer windings disposed for connection to the source of power, a plurality of related secondary windings, unidirectional current means associated with the secondary windings and connected in opposed relation to a centrally disposed bus, conductor means for connecting the bus to one of the electrodes, circuit means for connecting the mid-points of the secondary windings to the other electrode, a plurality of reactance means each having one winding in series circuit relation with one of said primary windings and a second winding associated with the first-mentioned reactor winding, and a single mercury vapor discharge device connected with said second windings for controlling the impedance of the first-mentioned reactance windings to control the welding current.

10. A resistance welding machine comprising, a polyphase source of power, a pair of relatively movable electrode members, a plurality of transformers having primary windings arranged for connection to the source, a plurality of through conductor members associated with each primary winding, conductor means for interconnecting the through conductor members in common to one of the electrodes, a plurality of dry plate type rectifier members paired in opposed connection about a central conductor member connected with the other electrode for supplying a unidirectional current to the welding circuit, and conductor means for connecting the through conductor members and the rectifier members.

11. A resistance welding machine comprising, a pair of relatively movable electrode members, supporting arms for the electrode members, a plurality of single phase welding transformers disposed in side-by-side relation with the primary windings thereof adapted for connection to a polyphase source, a plurality of through conductor members disposed to form a secondary winding for each of the transformers, conductor means associated with the through conductor members for connecting the mid-points of the secondary windings to one of the electrodes, a plurality of rectifier members of the dry plate type connected in opposed relation to a centrally disposed bus across each secondary winding for rectifying the welding current supplied by the secondary winding, and additional conductor means for connecting the centrally disposed bus to the other electrode.

WILHELM KAFKA.
WALTER MEENEN.